United States Patent

Siedenburg

[11] Patent Number: 5,878,076
[45] Date of Patent: Mar. 2, 1999

[54] DIRECT-SEQUENCE SPREAD SPECTRUM COMMUNICATION SYSTEM, A PRIMARY RADIO STATION, AND A SECONDARY RADIO STATION

[75] Inventor: Kurt Siedenburg, Essenheim, Germany

[73] Assignee: U.S. Philips Corporation, New York, N.Y.

[21] Appl. No.: 645,441

[22] Filed: May 13, 1996

[30] Foreign Application Priority Data

May 12, 1995 [EP] European Pat. Off. .............. 95201237

[51] Int. Cl.$^6$ ...................................... H04K 1/00
[52] U.S. Cl. ........................................... 375/206; 455/500
[58] Field of Search ................................. 375/200, 206, 375/354; 455/500; 327/164; 364/717

[56] References Cited

U.S. PATENT DOCUMENTS

| | | | |
|---|---|---|---|
| 4,847,861 | 7/1989 | Hamatsu et al. | 375/200 |
| 5,073,909 | 12/1991 | Kotzin et al. | 377/72 |
| 5,103,459 | 4/1992 | Gilhousen et al. | 375/209 |
| 5,612,973 | 3/1997 | Gershenfeld | 375/206 |
| 5,724,383 | 3/1998 | Gold et al. | 375/208 |
| 5,727,064 | 3/1998 | Reed, III | 375/200 |

FOREIGN PATENT DOCUMENTS

WO 952221 8/1975 WIPO .............. H04B 7/26

OTHER PUBLICATIONS

R. Price et al, "A Communication Technique for Multipath Channels", Proc. of the IRE vol. 46,Mar. 1958, pp. 555–570.
R. L. Pickholtz et al, "Theory of Spread–Spectrum Communications–A Tutorial", IEEE Tr. on Comm. vol. COM–30, No. 5, May 1982, pp. 855–884.
J.G. Proakis, "Digital Communications", McGraw–Hill, 1989, Chapters 7 and 8.
E.J. McCluskey, "Design Principles", Prentice/Hall Int. Inc., 1986, pp. 457–461.

*Primary Examiner*—Tesfaldet Bocure

[57] ABSTRACT

Known are direct-sequence spread spectrum systems (1) such as CDMA mobile radio systems applying short pseudo-noise sequences for encoding and decoding of data. A DS-SS communication system is provided in which less pseudo-noise sequences are used while at the same time providing efficient locking at the receiver side. To this end, a majority of the channels (BCH, PCH, AGCH, TCH, ACCH) in a cell (Z1, Z2) of a mobile radio system (1) share one long pseudo-noise sequence (PNL). At reception side, in a mobile radio station (MS1, MS2) or the like, efficient calculation of current sequence phases for current received channels is achieved by applying vector-matrix calculations to a received sequence state ($x_i$) and received sequence offset (ofset) that are transmitted by a base station (BS1, BS2). The vector-matrix calculations apply precalculated and stored sequence offset transformation matrices (A).

9 Claims, 4 Drawing Sheets

DIRECT-SEQUENCE SPREAD SPECTRUM COMMUNICATION SYSTEM, A PRIMARY RADIO STATION, AND A SECONDARY RADIO STATION

TECHNICAL FIELD

The present invention relates to a direct-sequence spread spectrum communication system comprising at least one primary radio station and a plurality of secondary radio stations, the primary radio station and the secondary radio stations being arranged for communication with each other via control channels and traffic channels. Such a communication system can be a mobile radio system in which the primary radio system is a radio base station, and the secondary stations are mobile radio stations, and also a cordless telephone system, a cordless LAN (Local Area Network), or the like.

The present invention further relates to a primary radio station and to a secondary radio station for use in such a communication system.

BACKGROUND OF THE INVENTION

Spread spectrum systems are well-known since long and have been described in numerous articles and handbooks, such as in a basic article describing a system implementing a direct-sequence spread spectrum system, "A Communication Technique for Multipath Channels", R. Price et al., Proc. of the IRE Vol. 46, March 1958, pp. 555–570, a tutorial article "Theory of Spread-Spectrum Communications—A Tutorial", R. L. Pickholtz et al, IEEE Tr. on Comm., Vol. COM-30, No. 5, May 1982, pp. 855–884, and a handbook "Digital Communications", J. Proakis, McGraw-Hill, 1989, Chapters 7 and 8. In Chapter 7, pp. 702–799 of said handbook digital signalling over fading multipath channels is described as is the case in a mobile radio system, and in Chapter 8 spread-spectrum receivers, especially pp. 802–804, describing direct-sequence spread spectrum, pp. 831–836 describing PN (Pseudo-Noise) sequences for DS SS, pp. 862–864. The pseudo-noise sequence is generated using a linear feedback shift register. The maximum length of the pseudo-noise sequence is $n=2^m-1$ bits, m being the number of shift register stages, and n being the period of the sequence. In a direct-sequence spread spectrum mobile radio system data to be transmitted are encoded using such pseudo-noise sequences. At reception side the data are decoded using correlation techniques. In known direct-sequence spread spectrum mobile radio systems for each channel, either a control channel or a traffic channel, a different short pseudo-noise sequence is used, the sequences preferably being orthogonal with respect to each other. In such a system, the data to be transmitted by the radio base station for instance are encoded using a chip-sequence of length n, and the data are decoded by the mobile radio station using a correlator with correlation window of length M. A pseudo-noise sequence typically is short when M>n. A chip is a time duration of a rectangular pulse corresponding to the reciprocal of the available bandwidth. In practical systems the so-called chip rate is a multiple of the information rate of data to be transmitted. When applying such short pseudo-noise sequences at reception side there will be no problem to decode the data. On the other hand, for each channel a different pseudo-noise sequence has to be generated. In particular in mobile radio systems with many subscribers per cell such generation of many different pseudo-noise sequences is cumbersome.

SUMMARY OF THE INVENTION

It is an object of the present invention to provide a direct-sequence spread spectrum communication system of the above kind in which less pseudo-noise sequences are to be generated while at the same time providing an efficient locking mechanism on the pseudo-noise sequences of channels at reception side.

To this end the direct-sequence spread spectrum communication system according to the present invention is characterized in that at least in a cell at least a majority of the channels share at least one long pseudo-noise sequence, generated by at least one linear feedback shift register, the channels being distinguishable within the at least one long pseudo-noise sequence, and in that for locking on a current channel using a long pseudo-noise sequence, a phase of the current channel within the long pseudo-noise sequence at receiver side is derived from state information about the linear feedback shift register transmitted via a control channel. The present invention is based upon the insight that despite the fact that it, is practically impossible to carry out a direct search for the current channel because of the fact that the single sequence is extremely long, the current channel can be recovered from the state information transmitted via a control channel e.g. by using a short pseudo-noise sequence, i.e. despite of the fact that the received phase information is in fact decoded too late, the proper phase of the current channel can still be determined.

In an embodiment of system according to the present invention, the state information is a previous state of the linear feedback shift register, and the state of the linear feedback shift register for the current channel is determined by transforming the previous state to the current state using a stored transformation matrix. Herewith, for a given channel only the previous state of the shift register has to be known, whereas the current channel can simply be computed from this state and the stored matrix. Typically such a phase calculation transforms the previous state to the current state over one frame of the system so that a fixed phase offset can be applied to the previous state.

In an embodiment of system according to the present invention, the state information is an offset with respect to a fixed reference state of the linear feedback shift register, and the offset of the current channel is determined from the received offset and a plurality of stored transformation matrices. Herewith variable offsets can be computed. With a suitably chosen set of stored matrices any offset can be calculated still with a reasonable computational effort and with a reasonable storage capacity. The extra degree of freedom of having available a plurality of stored matrices can also be used for the computation of inter-frame and intra-frame offsets in case of a more complex channel structure. Also, with large cells in which the propagation delay might become a significant parameter, the possibility of efficiently computing the offset for the current channel is advantageously applied.

Further embodiments are claimed in the dependent claims. Instead of the calculation of the phase of the current channel from a received previous state, the primary station can calculate a future state on the basis of the same principle. Then, the secondary station can simply adjust its local linear feedback shift register to the received future state. Also mixed calculations can be done, the primary station calculating an intermediate state, and the secondary state applying a phase shift to the received intermediate state. Then, relatively fast and relatively slow secondary stations can be supported, the fast secondary stations applying the intermediate state directly, and the slow secondary stations applying a further state shift to the received intermediate state. Also, the state locking can be used for coarse locking, while a further fine locking can be applied on the coarse locking by applying correlation thereto with the received chips. The latter approach can be taken so as to compensate for propagation delays or to resolve multipath transmission effects such as occur in mobile radio systems.

BRIEF DESCRIPTION OF THE DRAWING

The present invention will now be described, by way of example, with reference to the accompanying drawings, wherein FIG. 1 schematically shows a CDMA mobile radio system according to the present invention.

Throughout the figures the same reference numerals are used for the same features. Throughout the description vectors and matrices are indicated in bold type.

DETAILED DESCRIPTION

Figure 1:
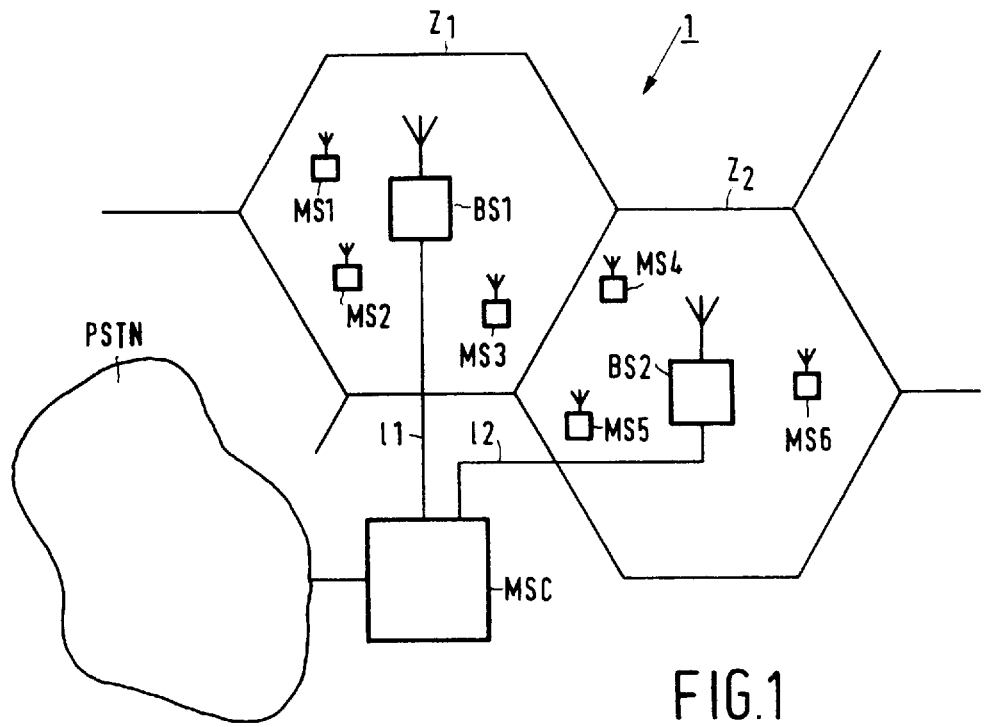

FIG. 1 schematically shows a cellular CDMA (Code Division Multiple Access) mobile radio system 1 as an example of a direct-sequence spread spectrum communication system according to the present invention, comprising a number of radio base stations BS1 and BS2 covering respective radio zones or cells Z1 and Z2. Each radio zone services a number of mobile radio stations MS1, MS2 and MS3, and MS4, MS5, and MS6, respectively. The radio base stations BS1 and BS2 are coupled to a mobile switching centre MSC via landlines 11 and 12. The mobile switching centre MSC is coupled to the public telephone switching network PSTN. The radio base stations BS1 and BS2 are arranged for transmitting spread spectrum encoded signals to the mobile radio stations, i.e. for transmitting downlink spread spectrum signals, and are arranged for processing spread spectrum encoded signals transmitted by the mobiles, i.e for processing uplink spread spectrum signals. Also the mobiles are arranged to process spread spectrum signals from the base stations, i.e. for processing downlink spread spectrum signals, and are arranged for transmitting uplink spread spectrum signals. A CDMA mobile radio system is a multiple access system operating according to spread spectrum techniques, i.e. after coding and/or interleaving of datastreams, as the case may be, these datastreams are frequency spread before transmission. At a reception side a received signal is de-spread, and de-interleaved and/or decoded, as the case may be. The datastreams may originate from a single user such as a mobile radio user, or may be combined datastreams originating from several users.

Figure 2:
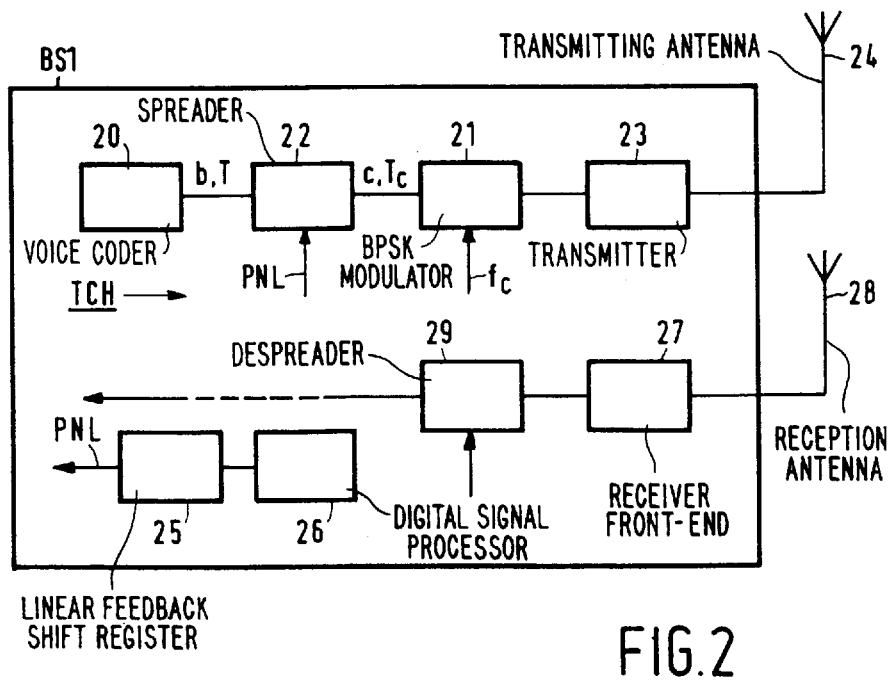
FIG. 2 shows a block diagram of a radio base station.

FIG. 2 shows a block diagram of the radio base station BS1 for use in the communication system 1 according to the present invention. Shown are the main parts of a single digital traffic channel TCH. In the sequel other channels will be shown. The radio base station BS1 comprises a voice coder 20 supplying bits b having a symbol period T to a spreader 22 to which also a long pseudo-noise sequence PNL is fed. The spread bits are fed to a BPSK (Binary Phase Shift Keying) modulator 21 modulating the spread bits with a central carrier $f_c$ common to all channels. The modulator 21 provide modulated chips c with a chip period $T_c$ to a transmitter 23 which is coupled to a transmitting antenna 24. In the given example a system bandwidth of 1.023 MHz is taken, and the channels are given a frame-length of 10 msec. Herewith, a frame consists of 10230 chips. For practical reasons, the long pseudo-noise sequence PNL is generated by means of a dedicated hardware linear feedback shift register 25, which is controlled by a digital signal processor 26. Linear feedback shift registers in itself are well-known in the art, e.g. from the handbook "Logic Design Principles", E. J. McCluskey, Prentice/Hall Int. Inc., 1986, pp. 457–461 showing maximum length linear feedback shift registers for generating pseudo-noise sequences and corresponding generator polynomials. A pseudo-noise sequence is considered long if its length exceeds the length of the correlator that is applied to match the sequence with a replica of the sequence at receiver side. In the given example the long pseudo-noise sequence is given a length of $2^{41}-1$, and the correlator is given a length of $2^9$. In this respect it is to be realized that it takes about a month before the long pseudo-noise sequence assumes the same state as its initial state, i.e. the register typically is repetitive with a cycle of one month. For receiving spread spectrum modulated signals from mobile radio stations, the radio base station BS1 comprises a receiver front-end 27 that is coupled to a reception antenna 28 and a de-spreader 29 to which appropriate pseudo-noise sequences are fed. Typically the radio base station BS1 comprises a plurality of such reception branches.

Figure 3:
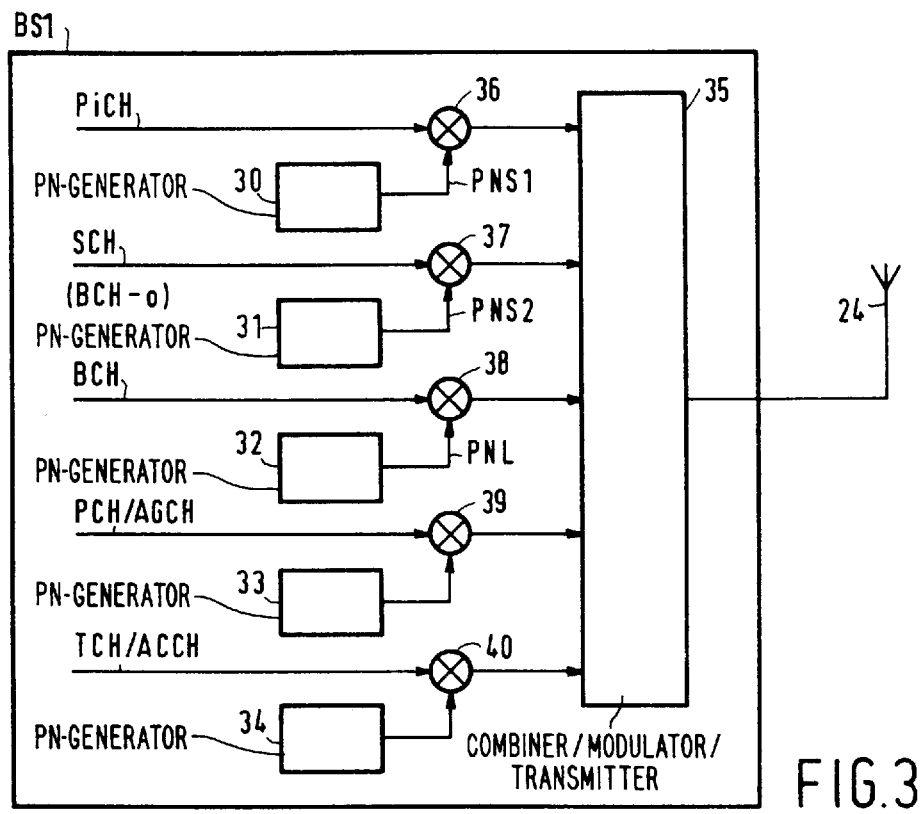
FIG. 3 shows channel mapping in a radio base station.

FIG. 3 shows channel mapping in the radio base station BS1. The radio base station BS1 supports various logic channels necessary for call setup, call control, and call traffic. A pilot channel PiCH is provided for transmitting an unmodulated short pseudo-noise sequence PNS1 generated by means of a PN-generator 30, and further a synchronisation channel SCH of which the data are spread by means of a PN-generator PNS2. A broadcast channel BCH is spread with the long pseudo-noise sequence PNL generated by means of the generator 32 representing an appropriate state of the long sequence PNL. Similarly, paging or access grant channels PCH/AGCH, and traffic or associated control channels TCH/ACCH are spread by means of the respective generators 33 and 34, representing appropriate states of the long sequence PNL. Instead of one long pseudo-noise sequence more long pseudo-noise sequences may be applied (not shown in detail). Then, the allocation of channels can be distributed over the long pseudo-noise sequences. The shown logic channels are mapped onto physical channels or frames and are transmitted through the transmitting antenna 24 to the mobile radio stations by means of a combiner/modulator/transmitter 35 in the so-called downlink channel. Further shown are PN-modulators 36, 37, 38, 39, and 40. The particular mapping of logical channels onto physical channels is system dependent and can be chosen appropriately.

Figure 4:
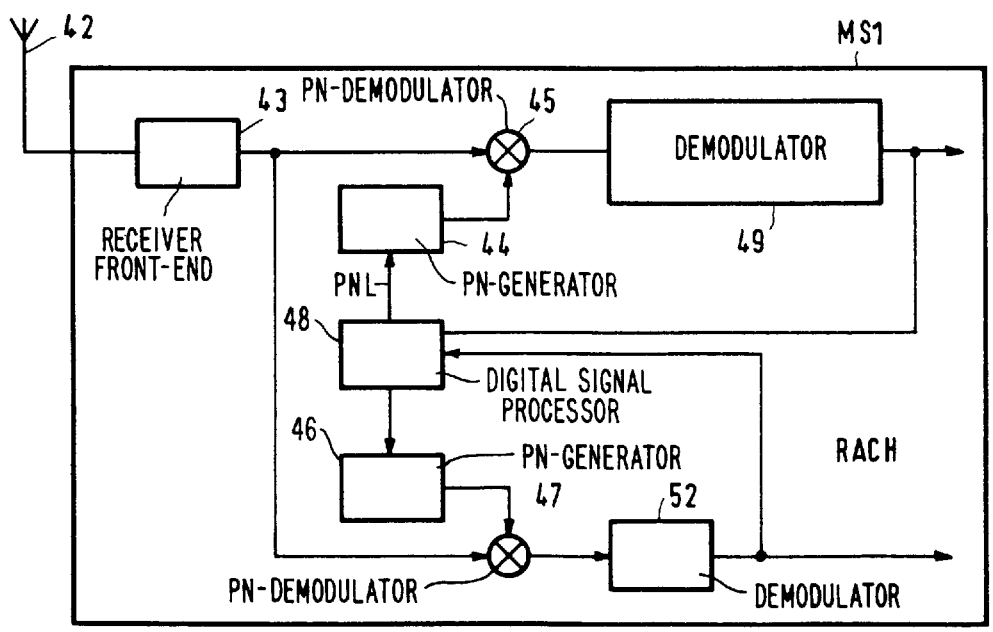
FIG. 4 shows a mobile radio station.

FIG. 4 shows the mobile radio station MS1 for use in the communication system 1. The mobile radio system MS1 comprises a reception antenna 42 which is coupled to a receiver front-end 43. The mobile radio station MS1 further comprises a de-spreader for channels modulated with a long pseudo-noise sequence consisting of a pseudo-noise generator for long sequences 44 and a PN-demodulator 45, and a de-spreader for channels modulated with a short pseudo-noise sequence consisting of a pseudo-noise generator for short sequences 46 and a PN-demodulator 47. The states of the pseudo-noise generators 44 and 46 are controlled by a digital signal processor 48. According to the present invention, particularly the offset of the long pseudo-noise generator 44 is controlled so as to properly and efficiently lock on the relevant phase of the long pseudo-noise sequence PNL used by the current channels. The mobile radio station MS1 further comprises a demodulator 49, which is coupled to the digital signal processor 48. In the short-sequence branch, the mobile radio station comprises a similar demodulator 52 which is coupled to the digital signal processor 48. According to the present invention, the digital signal processor 48 is programmed to provide the proper phase for the local long pseudo-noise sequence PNL from state information about the linear feedback shift register 25 in the radio base station BS1 so that the current received channel is properly locked. As an example a current channel to be locked is the broadcast channel BCH carrying information about current access grant channels AGCH. On the uplink the mobiles can request access to the system via a random access channel RACH so as to initiate an outgoing call from the mobile. If the radio base station BS1 grants such a request it broadcasts an appropriate access grant channel in the broadcast channel BCH on the downlink. Before a mobile radio station issues such a request in an acquisition and sync phase it locks to an appropriate base station. To this end, in idle mode, it first locks on the unmodulated pilot channel PiCH which applies repetitive transmission and which provides a coherent carrier reference for all mobiles to use in their demodulation process. Different base stations apply different short PN-sequences for encoding their pilot channel(s) so that the mobile can distinguish the base stations to lock to. Then, the mobile radio station MS1 can find state information about a broadcast channel's phase BCH-o on the modulated sync channel SCH which is aligned with its base station's pilot channel PiCH. The received phase information BCH-o in the form of the state of the shift register at the side of the base station BS1 in fact does not reflect the current phase of the broadcast channel BCH, because the mobile radio station MS1 needs time to receive and demodulate the phase BCH-o, typically a time period of 2 frames, i.e. 20 msec or 20460 chips in the given example. According to the present invention, the actual phase of the current BCH channel is computed by applying a matrix transformation. In the given example, the phase correction is fixed because it is known a priori, i.e. the phase correction corresponds to a shift of the received phase BCH-o over 20460 chips. In this example, the following transformation is applied:

$$x_{i+20460} = A^{20460} * x_i$$

which transformation achieves a shift over two frames of the received phase BCH-o. Herein, the matrix $A^{20460}$ is independent of the vector x, i.e. it is state independent so that it can be stored in the mobile for a given or a priori known phase correction. Preferably, the matrix multiplications for achieving $A^{20460}$ are carried out off-line and the result is stored in a ROM (not shown) in the mobile MS1. The vector $x_i$ represents the actual code phase of the long PN-sequence in the base station BS1, the vector components corresponding to the contents of the shift register. A single step of the shift register corresponds to a transformation $x_{i+1} = A * x_i$, the matrix A being determined by the type of shift register and the generator polynomial.

For the following type of linear feedback shift register, the matrix A has the following appearance:

$$A = \begin{bmatrix} 0 & 0 & 0 & 0 & \ldots & 0 & 0 & 0 & c_n \\ 1 & 0 & 0 & 0 & \ldots & 0 & 0 & 0 & c_{n-1} \\ 0 & 1 & 0 & 0 & \ldots & 0 & 0 & 0 & c_{n-2} \\ \ldots & & & & & & & & \\ 0 & 0 & 0 & 0 & \ldots & 0 & 0 & 1 & c_1 \end{bmatrix}$$

Herein, the coefficients $c_1, c_2, \ldots, c_n$ represent the generator polynomial, n is the length of the shift register, and the ones represent shift stages.

For another type of linear feedback shift register, the matrix A has the following appearance:

$$A = \begin{bmatrix} c_1 & c_2 & c_3 & c_4 & \ldots & c_{n-3} & c_{n-2} & c_{n-1} & c_n \\ 1 & 0 & 0 & 0 & \ldots & 0 & 0 & 0 & 0 \\ 1 & 1 & 0 & 0 & \ldots & 0 & 0 & 0 & 0 \\ \ldots & & & & & & & & \\ 0 & 0 & 0 & 0 & \ldots & 0 & 0 & 1 & 0 \end{bmatrix}$$

For a given number of shift steps the relevant matrices are preferably computed off-line and are stored in the mobile station MS1 accordingly. Because of the fact that all vectors and offset matrices are Boolean, the multiplications reduce to n logical AND operations of n digits succeeded by n determinations whether the number of ones in the result of the AND-operation is odd or even. Herewith, the computation is very simple and is fast. In the given example the adapted matrix $A^{20460}$ is stored in the mobile radio station MS1. For other fixed shifts, other adapted matrices are stored correspondingly.

Figure 5:
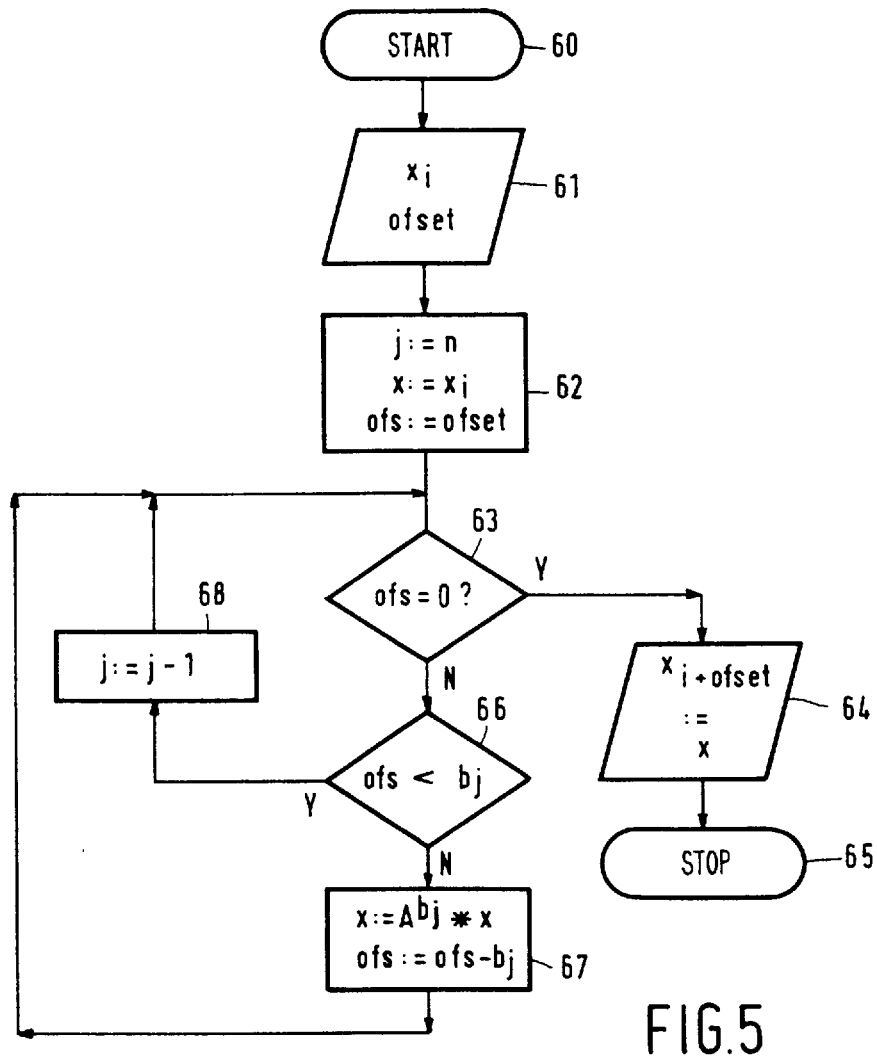
FIG. 5 shows a flow chart of an embodiment of the present invention.

FIG. 5 shows a flow chart of an embodiment of the present invention when computing a variable phase correction. In this embodiment, a fixed reference point is taken for the shift register at the side of the base station BS1, i.e. $x_i$ in FIG. 5 is given a fixed value, and the offset with respect to this reference point is transmitted, e.g. the broadcast channel BCH's offset in the sync channel SCH. Then, the offsets for adjacent frames differ by 10230 chips. Several matrices $A^{b_j}$ are computed in advance and stored, for j=1, 2, . . . , n in ascending order (e.g. $b_{j+1} > b_j$). Preferably, the matrices are calculated by means of an off-line computer and are stored in a ROM (not shown) of the digital signal processor 48. In order to be able to compute any offset, $b_1 = 1$. The degree of freedom is the number of precomputed matrices $A^{b_j}$. A tradeoff has to be made between the computational effort and the storage requirements for the matrices. In block 60, the offset computation starts. In block 61, the shift register's state $x_i$ and the required offset ofset are inputted. In block 62, the variable j is assigned the value n, a state vector x is assigned the state $x_i$, and a working variable ofs is assigned the inputted offset ofset. In block 63 it is tested whether the offset ofs is zero. If so, in block 64 the required offset vector $x_{i+ofset}$ is assigned the state vector x, and the computation stops in block 65. Otherwise, in block 66 it is tested whether the offset is within offset boundaries of the precomputed matrices. According to whether the algorithm is to the left or to the right side of an offset boundary an appropriate shift step to the state vector x or a move to a next precalculated matrix is made. Thus, in block 67 a shift step is applied to the state vector x using the precomputed matrix $A^{b_j}$ and the offset ofs is set to (ofs$-b_j$). In block 68, a move is made to the previous precalculated matrix by setting the variable j to j−1. For illustrating the above calculation, and offset value equal to 25 is assumed, and a shift register of length equal to 6. And further, the matrices $A^1, A^2, A^4, A^8, A^{16}$, and $A^{32}$ are stored. Then, ofset=25 (binary '011001'=16+8+1), and n=6. Via the blocks 63, 66, 68, 63, 66, in the block 67 a transformation using the matrix $A^{16}$ is carried out, then via the blocks 63, 66, 68, 63, 66, in the block 67 a transformation using the matrix $A^8$ is carried out, and at last, via the blocks 63, 66, 68, 63, 66, 68, 63, 66, 68, 63, 66, in the block 67 a transformation using the matrix $A^1$ is carried out. After this last transformation, in the block 63 it is established that the working variable is zero, and in the block 64, the offset state $x_{i+ofset}$ is obtained. In one example, matrices $A^{2^j}$, A to the power $2^j$, are precomputed, for j=0, 1, 2, 3, ..., 40. This choice, which requires storage of 41 matrices and 20.5 matrix-vector multiplications on the average for an 41 bit shift register, achieves simple implementation because in block 66 then the comparison is simply a bit comparison. The 41 matrices are calculated with minimum computational effort, e.g. after calculation of $A^2$, $A^4$ is calculated by $A^2*A^2$, and so on. In another example, matrices $A^{k*4^j}$, A to the power $k*4^j$, are precalculated and stored, j=0, 1, 2, 3, ..., 20; k=1, 2, 3. This choice, requiring additional matrices to be stored, requires 15.5 matrix-vector multiplications on the average. For every two bits within the offset a multiplication is necessary. In still another example, matrices $A^{4^j}$, A to the power $4^j$, j=0, 1, 2, 3, ..., 20 are precalculated and stored. Herewith, 21 matrices have to be stored, while on the average 30.5 matrix-vector calculations will have to carried out. So, the present invention provides an efficient way of determining code phases from a given code phase when the number of chips in between or the offset is known.

Figure 6:
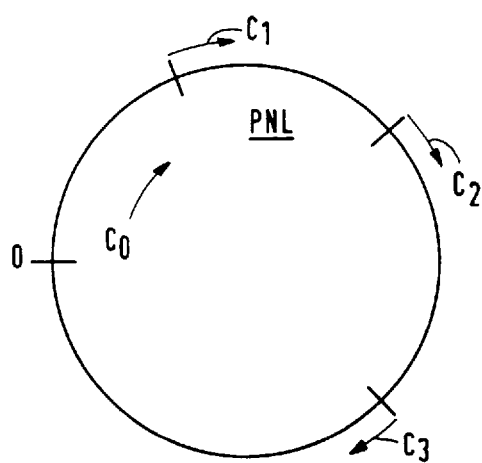
FIG. 6 shows evolving of channels along the long pseudo-noise sequence.

FIG. 6 shows evolving of channels along the long pseudo-noise sequence. The shown channels $C_1$, $C_2$, and $C_3$ can evolve with respect to a fixed reference point O in the long pseudo-noise sequence PNL or can evolve with respect to a reference channel $C_0$ which itself also evolves along the long pseudo-noise sequence PNL. I.e. the offsets can either be time variant or time invariant. When locking to a channel either such a time variant or time invariant offset can be taken into account. To this end, the primary station BS1 can typically transmit the contents of its linear feedback shift register, the offset with respect to the fixed reference point O, or the offset with respect to the reference channel $C_0$. In an initial phase, when no locking to the channel has occurred yet, only transmission of the contents of the linear feedback shift register or the offset with respect to the fixed reference point O are applicable for locking. In the case of transmitting the contents of the shift register and the offset with respect to the fixed reference point O, the sync channel SCH can contain a reference to the broadcast channel BCH which then is the first channel in the long pseudo-noise sequence. In the case of an offset with respect to the reference channel, the broadcast channel BCH can be a reference channel for other channels such as the traffic channels TCH.

Figure 7:
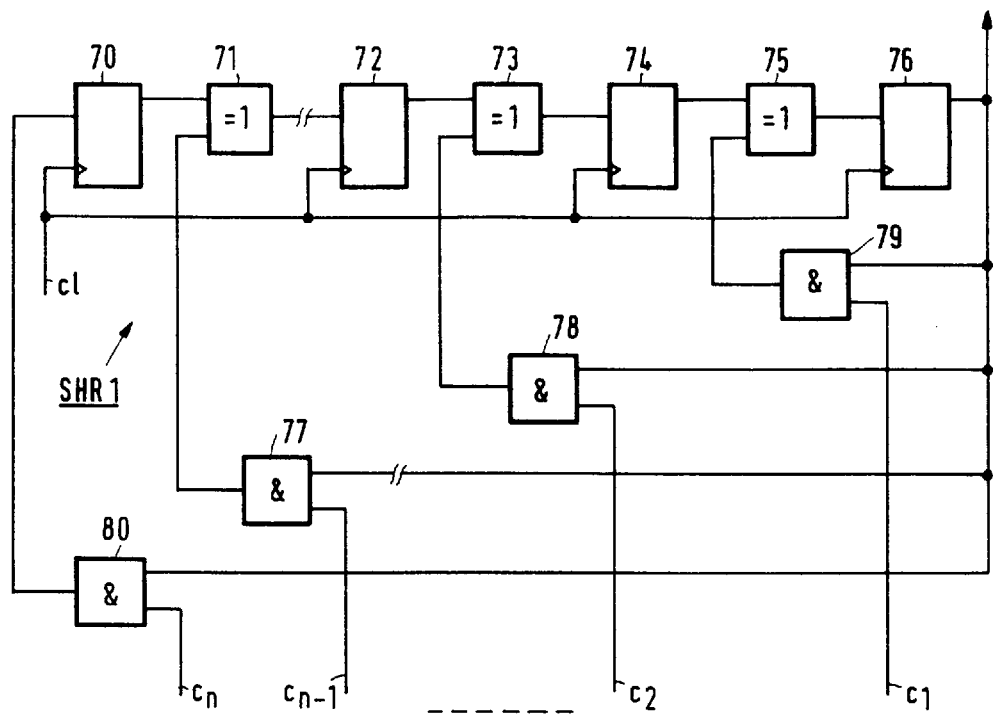
FIG. 7 shows a first linear feedback shift register.

FIG. 7 shows a first linear feedback shift register SHR1 corresponding to the first described matrix A. The register SHR1 comprises a series arrangement of flipflops and exclusive-OR gates flipflop 70, XOR-gate 71, flipflop 72, XOR-gate 73, flipflop 74, XOR-gate 75, and flipflop 76, the latter providing an output of the register SHR1. The flipflops 70, 72, 74, and 76 are clocked by a common clock cl. Other inputs of the XORs 71, 73, and 75 and coupled to respective outputs of AND-gates 77, 78, and 79 which at input side are coupled to the output of the flipflop 76 which is further coupled to an input of the flipflop 70 via an AND-gate 80. To other respective inputs of the AND-gates 79, 78, 77, and 80, the respective polynomial coefficients $c_1$, $c_2$, ..., $c_{n-1}$, and $c_n$ are fed. The coefficients $c_1$, $c_2$, ..., $c_{n-1}$, and $c_n$ are suitably chosen, preferably so as to represent a primitive polynomial as described in said McCluskey handbook.

Figure 8:
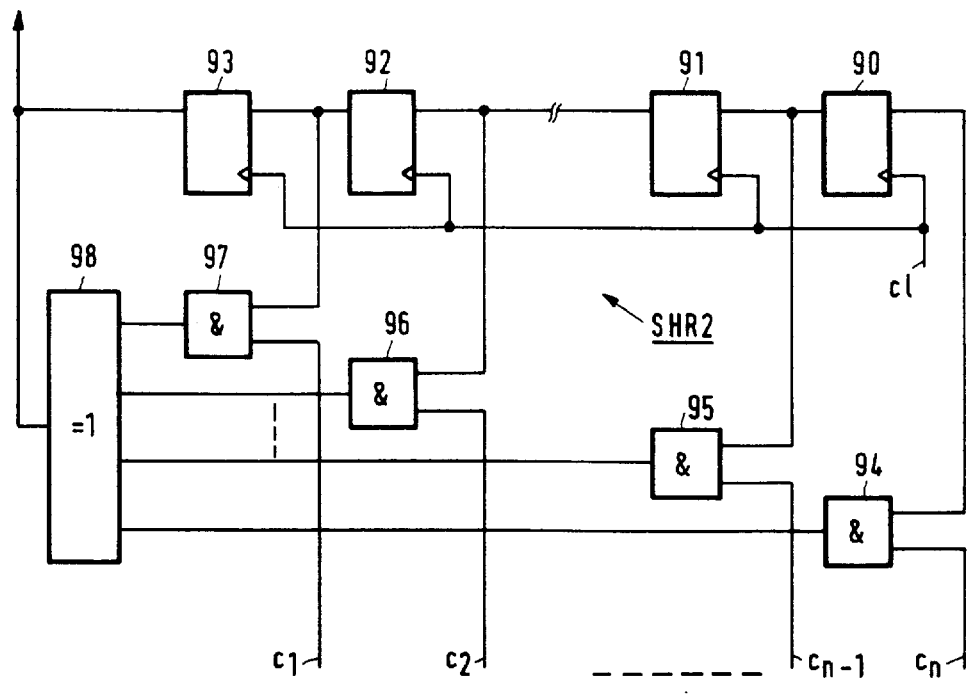
FIG. 8 shows a second linear feedback shift register.

FIG. 8 shows a second linear feedback shift register SHR2 corresponding to the second described matrix A. The register SHR2 comprises a series arrangement of flipflops 90, 91, 92, and 93. At input side, the flipflops 90, 91, 92, and 93 are coupled to inputs of respective AND-gates 94, 95, 96, and 97 to other inputs of which the polynomial coefficients $c_n$, $c_{n-1}$, ..., $c_2$, and $c_1$ are fed, respectively. At output side, the AND-gates 94, 95, 96, and 97 are coupled to an exclusive-OR gate 98 of which an output that is coupled at an output of the flipflop 93 forms the output of the register SHR2.

The present invention can thus be applied for various applications whenever there is a need to lock to a new channel. E.g. for locking to the broadcast channel BCH or a traffic channel TCH, as described, but also for a handover to a new base station where the new base station has to lock on the present mobile's channels, or for macro diversity where a mobile station has a radio link to more than one radio base station and the useful data should be available at all base stations so that the best quality link can be chosen or a combination of data received via the various links can be taken. In the given example one long pseudo-noise sequence was applied. E.g. where traffic channels and associated control channels ACCH are mapped on separate physical channels, two distinct long pseudo-noise sequences can be applied.

I claim:

1. A direct-sequence spread spectrum communication system comprising at least one primary radio station and a plurality of secondary radio stations, the primary radio station and the secondary radio stations being arranged for communication with each other via control channels and traffic channels, characterized in that at least in a cell at least a majority of the channels share at least one long pseudo-noise sequence, generated by at least one linear feedback shift register, the channels being distinguishable within the at least one long pseudo-noise sequence, and in that for locking on a current channel using a long pseudo-noise sequence, a phase of the current channel within the long pseudo-noise sequence at receiver side is derived from state information about the linear feedback shift register transmitted via a control channel.

2. A direct-sequence spread spectrum communication system according to claim 1, wherein the state information is a previous state of the linear feedback shift register, and the state of the linear feedback shift register for the current channel is determined by transforming the previous state to the current state using a stored transformation matrix.

3. A direct-sequence spread spectrum communication system according to claim 1, wherein the primary station determines a future state for a given channel with a predetermined offset from a state of the linear feedback shift register for the channel by transforming the state to the future state using the stored transformation matrix, the future state being transmitted as the state information.

4. A direct-sequence spread spectrum communication system according to claim 1, wherein the primary station determines an intermediate state for a given channel with a predetermined offset from a state of the linear feedback shift register for the channel by transforming the state to the intermediate state using the stored transformation matrix, the intermediate state being transmitted to the secondary station, and at the side of the secondary station the state of the linear feedback shift register for the current channel is determined by using the intermediate state directly and/or by transforming the intermediate state using the stored transformation matrix.

5. A direct-sequence spread spectrum communication system according to claim 1, wherein the state information is an offset with respect to a fixed reference state of the linear feedback shift register, and the contents of the linear feedback shift register of the current channel is determined from the received offset and a plurality of stored transformation matrices.

6. A direct-sequence spread spectrum communication system according to claim 1, wherein the locking on the current channel is a coarse locking, and a fine locking is achieved by loading a correlator in the secondary station with a contents of the linear feedback shift register corresponding to the phase of the current channel and correlating the loaded correlator with received chips.

7. A primary radio station for use in a direct-sequence spread spectrum communication system, which primary station comprises means for communicating with a plurality of secondary radio stations via control channels and traffic channels, characterized in that for at least a majority of the channels the primary station shares at least one long pseudo-noise sequence, generated by at least one linear feedback shift register, the channels being distinguishable within the at least one pseudo-noise sequence, and in that the primary station is arranged for transmitting state information about the linear feedback shift register to the secondary stations via a control channel, the primary station using a short pseudo-noise sequence for encoding the state information so that the secondary station can decode received data in a current channel using the long pseudo-noise sequence.

8. A secondary radio station for use in a direct-sequence spread spectrum system, which secondary radio station comprises means for communicating with a primary radio station via control channels and traffic channels, characterized in that the secondary radio station is arranged for receiving from the primary station at least a majority of the channels using at least one long pseudo-noise sequence generated by at least one linear feedback shift register, the channels being distinguishable within the at least one pseudo-noise sequence, and in that the secondary radio station is arranged for locking on a current channel using the long pseudo-noise sequence by deriving a phase of the current channel from state information about the linear feedback shift register received from the primary station via a control channel.

9. A direct sequence spread spectrum communication system comprising at least one primary radio station and a plurality of secondary stations, the primary and secondary stations being configured to communicate with each other via control channels and traffic channels, in which system the at least one primary station is configured to generate at least one long pseudo-noise sequence for shared use by at least a majority of the control and traffic channels, and to transmit state information of a current channel represented by a part of the long pseudo-noise sequence to the secondary radio stations, the secondary radio stations being configured to distinguish channels represented by different parts of the long pseudo-noise sequence using the state information received from the secondary radio station.

* * * * *